June 19, 1945.  J. F. GEIBEL  2,378,697

WELDING APPARATUS

Filed May 18, 1942  4 Sheets-Sheet 1

Inventor,
John F. Geibel,
by Walter P. Geyer
Attorney.

June 19, 1945.  J. F. GEIBEL  2,378,697
WELDING APPARATUS
Filed May 18, 1942  4 Sheets-Sheet 2

Inventor,
John F. Geibel,
by Walter P. Geyer
Attorney

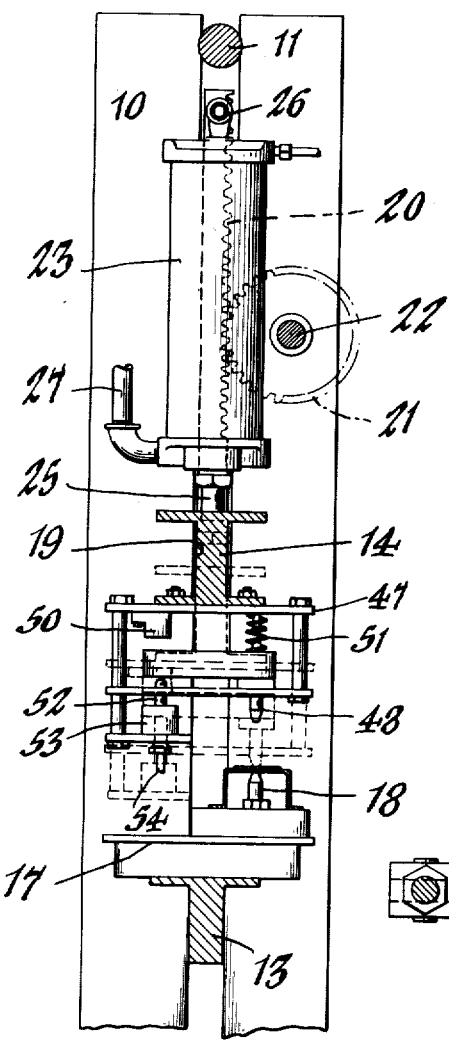
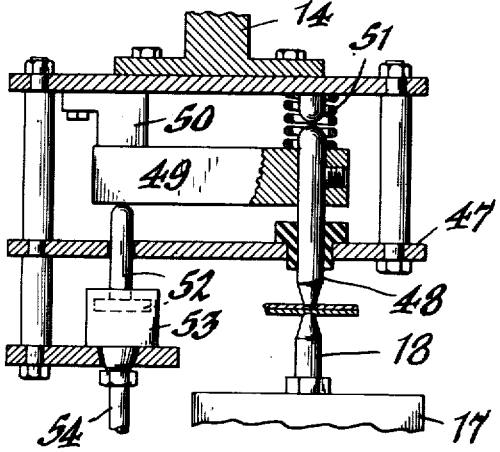
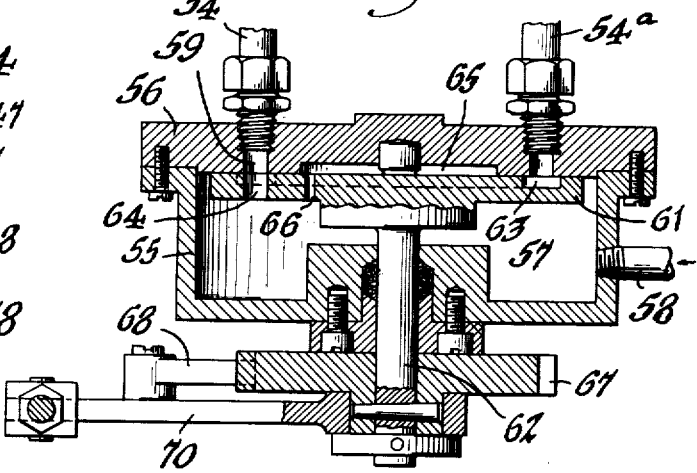
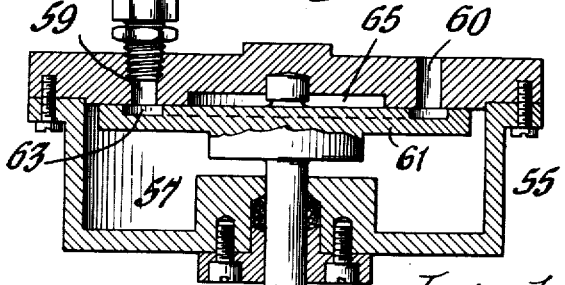
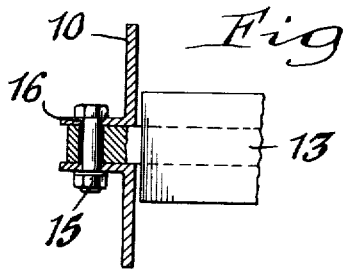

June 19, 1945.  J. F. GEIBEL  2,378,697
WELDING APPARATUS
Filed May 18, 1942   4 Sheets-Sheet 4

Inventor,
John F. Geibel,
by Walter P. Geyer
Attorney

Patented June 19, 1945

2,378,697

UNITED STATES PATENT OFFICE 2,378,697

WELDING APPARATUS

John F. Geibel, Buffalo, N. Y., assignor to Master Metal Products, Inc., Buffalo, N. Y., a corporation of New York Application May 18, 1942, Serial No. 443,423

13 Claims. (Cl. 219—4)

This invention relates generally to the art of welding, but more particularly to certain new and useful improvements in a multiple spot welding apparatus.

One of the objects of the invention is to provide a multiple spot welding apparatus which is so designed as to automatically make a plurality of welds in a given piece of work in rapid sequential order, and which is pneumatically controlled in predetermined timed relation throughout its several operations.

Another object is to provide a welding apparatus of this character having a simple and reliable pneumatic control system for governing the movement of its parts to and from a work-holding or operating position.

Other features of the invention reside in the construction and arrangement of parts hereinafter described and particularly pointed out in the appended claims.

Figure 1:
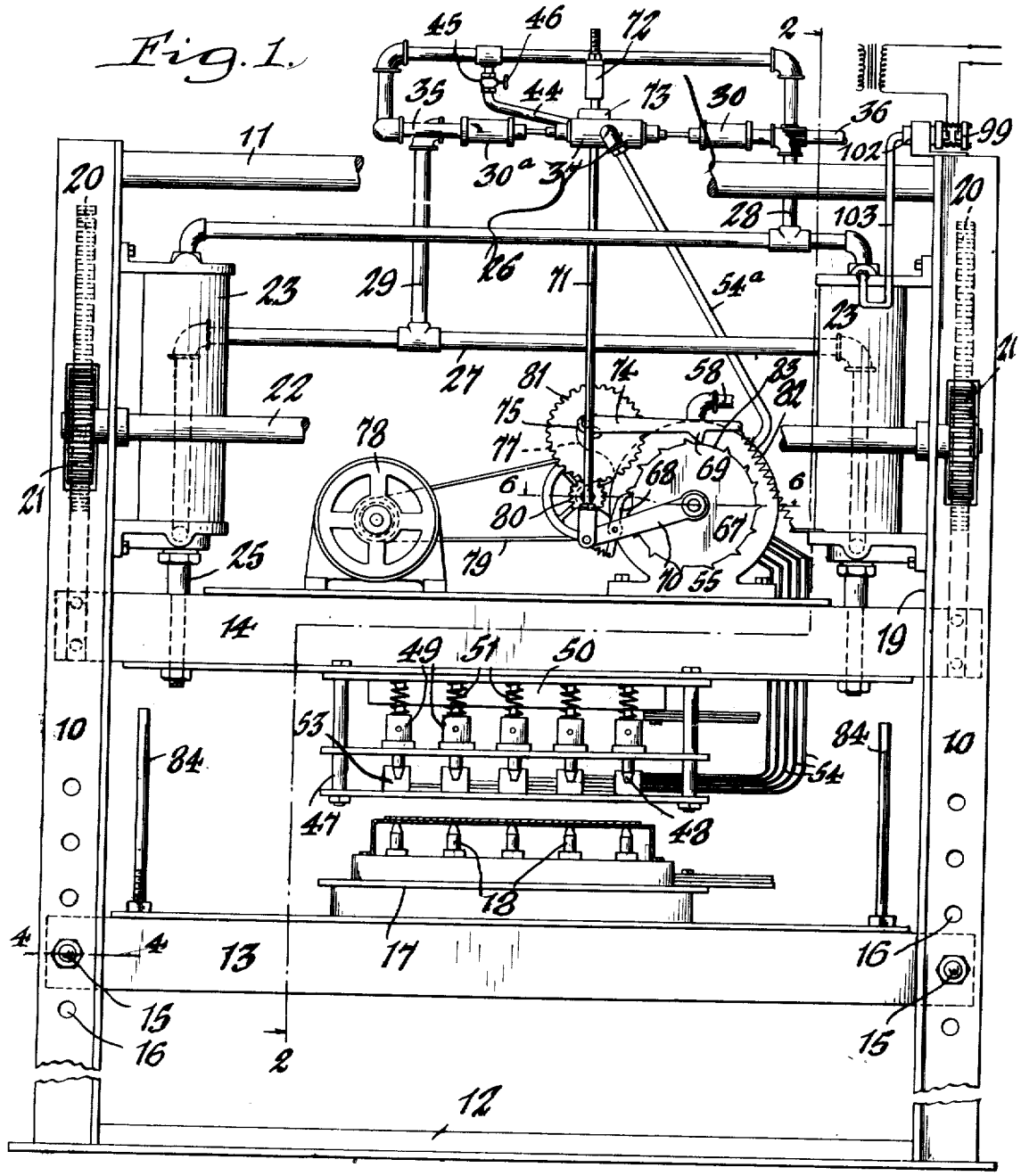
Figure 9:
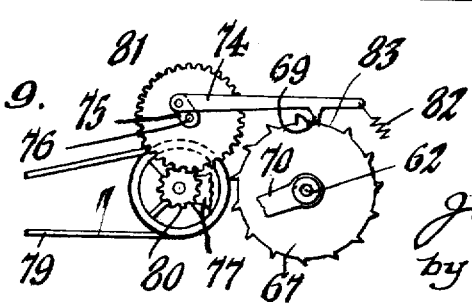
Figure 5:
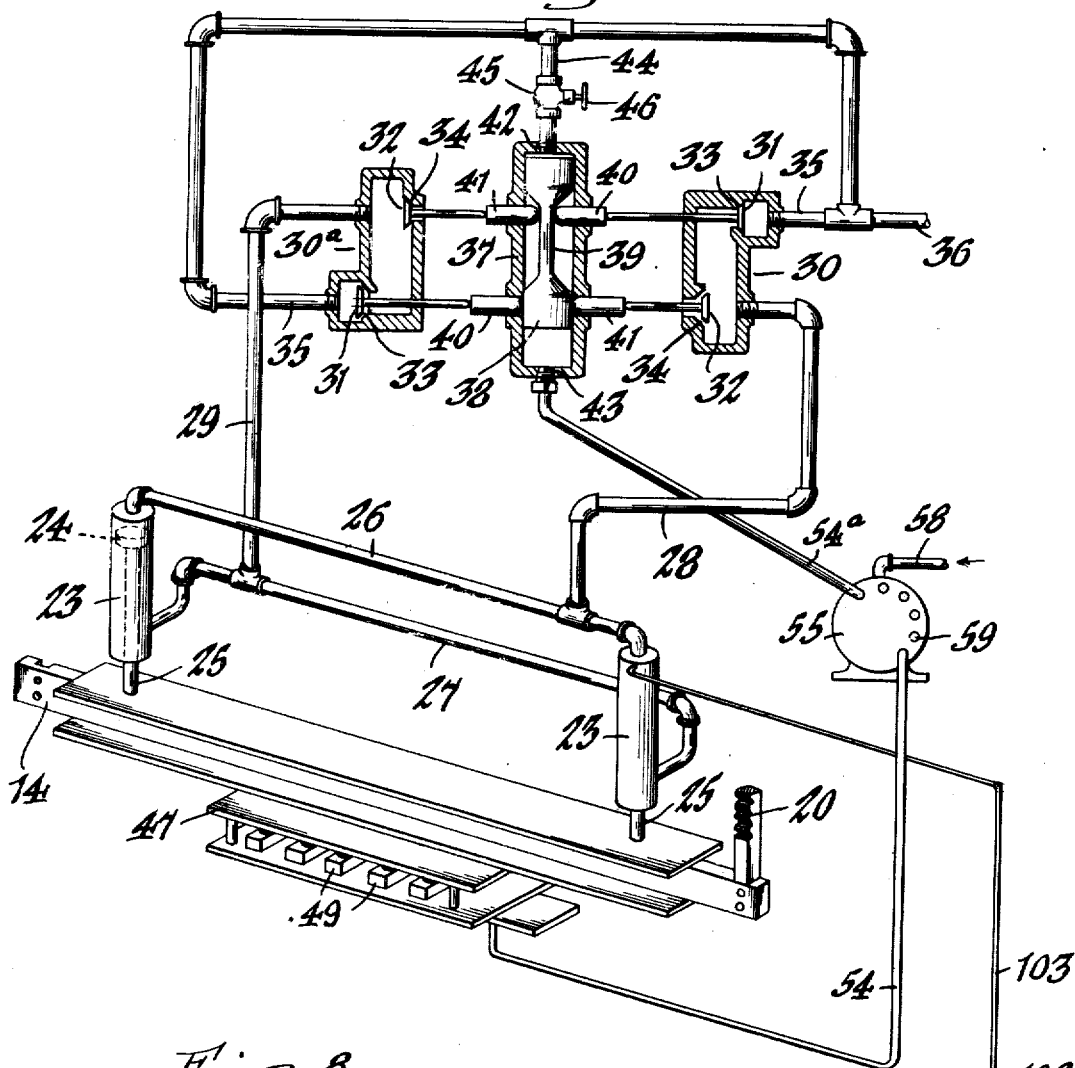
Figure 8:
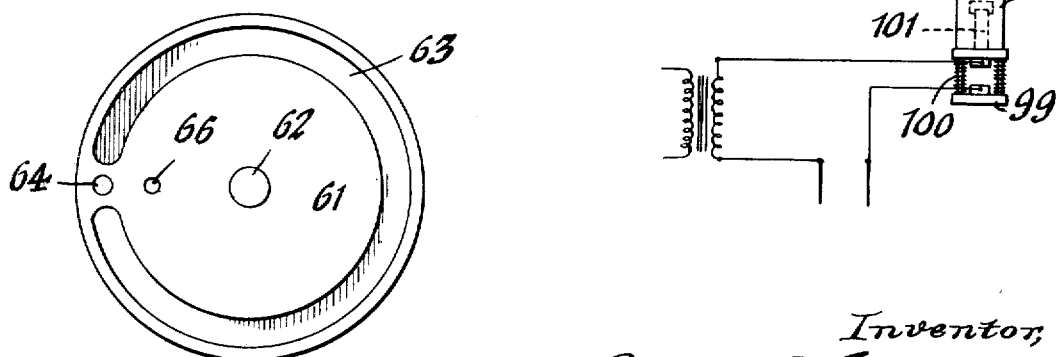
Figure 10:
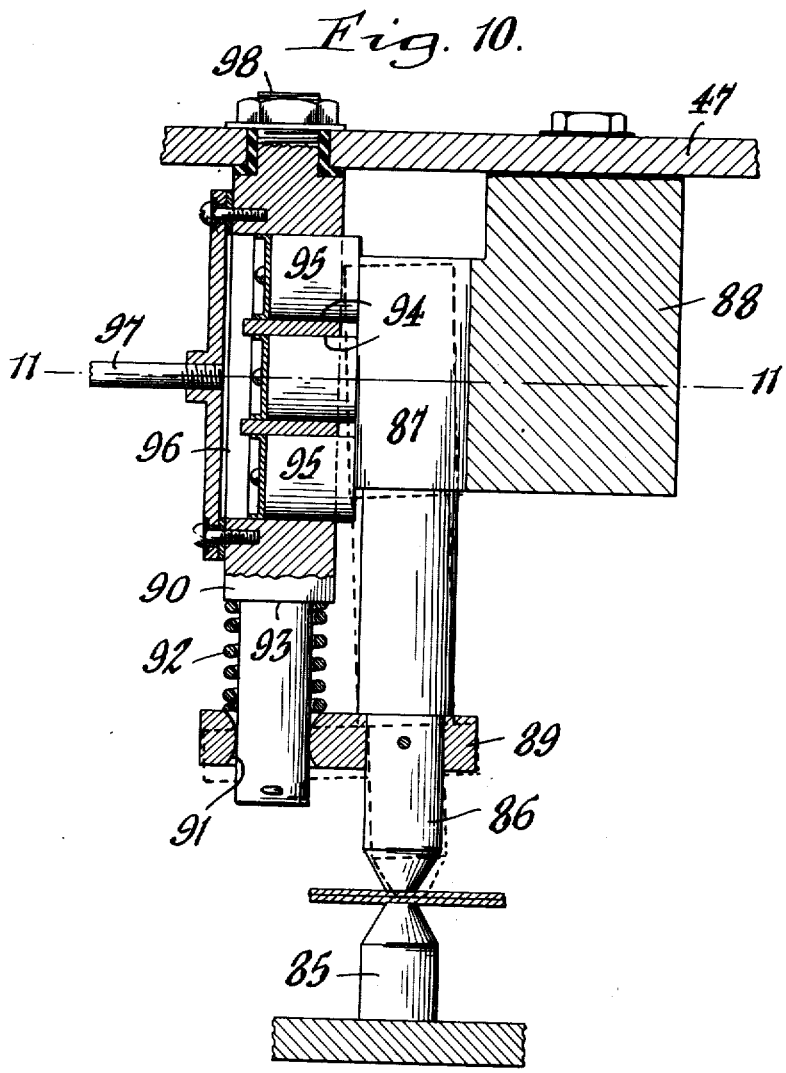
Figure 11:
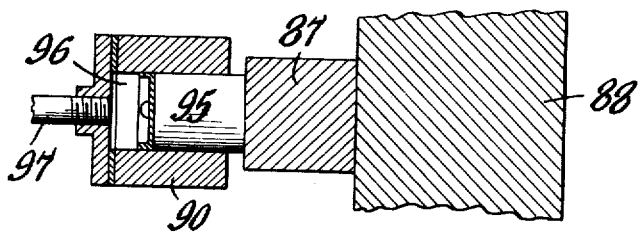

In the accompanying drawings:

Figure 1 is a front elevation of the welding apparatus embodying my invention. Figure 2 is a transverse vertical section taken substantially in the plane of line 2—2, Figure 1. Figure 3 is a similar fragmentary section showing the electrode bearing parts in their operative welding position. Figure 4 is a horizontal section taken on line 4—4, Figure 1. Figure 5 is a diagrammatic sectional perspective view of the pneumatic control mechanism of my invention. Figure 6 is an enlarged horizontal section taken in the plane of line 6—6, Figure 1, showing the air control valve unit in an operative position. Figure 7 is a similar view showing the parts in an inoperative or exhausting position. Figure 8 is a plan view of the valve disk of the valve unit. Figure 9 is a fragmentary sectional side view of the intermittent drive mechanism for the valve unit. Figure 10 is a transverse vertical section of a modified form of the electrode mounting. Figure 11 is a horizontal section on line 11—11, Figure 10.

Similar characters of reference indicate corresponding parts throughout the several views.

In the preferred embodiment of the invention shown in the drawings, the same comprises an upright frame for supporting its working parts and consists of side standards 10, 10 suitably braced at their top and bottom by tie members 11 and 12, respectively. Disposed between these standards are relatively movable work and welder-point supporting rails or platforms 13, 14, the lower platform 13 being adapted to be fixed at one or another of a plurality of elevations by bolts 15 engaging one or another of the openings 16 formed in a vertical row in the standards. Applied to a support 17 secured to this fixed platform and rising therefrom are fixed conductor points 18 which are disposed in any predetermined relation so as to produce the welds in the work where desired, the work being placed over these points preparatory to the multiple welding operation. These conductor points are connected to one of the secondary leads of the spot welder unit (not shown).

The companion platform 14 is disposed above the fixed platform 13 for vertical movement relative thereto to and from a welding position, and for this purpose is guided at its opposite ends in ways 19 formed in the standards 10. In order to maintain this movable platform in a true horizontal position during its movements, it has gear racks 20 thereon engaging companion gears 21 fixed on the ends of a horizontal shaft 22 journaled on said standards. Applied to the opposing inside faces of these standards are upright air cylinders 23 having pistons 24 operable therein whose depending rods 25 are connected to the corresponding ends of the platform 14. These cylinders are connected at their upper and lower ends to air-conducting pipes 26 and 27, respectively, which in turn are connected to master pipes 28 and 29 and through which pipes air under pressure is alternately admitted and exhausted at predetermined times for lowering and raising the platform. When air under pressure is admitted to the upper ends of the cylinders to effect the lowering of the platform or to the lower ends of the cylinders for raising the platform, the air in the opposite ends of the cylinders is adapted to be exhausted, respectively, through one or the other set of pipes 27, 29 or 26, 28.

The admission of air under pressure to and the exhausting of the air from the platform-actuating cylinders 23 is automatically controlled by a system of duplicate valve mechanisms disposed at the upper end of the frame between standards 10, one set governing the downward movement of the platform and the other set its upward movement. Each valve mechanism preferably consists of a valve body 30 or 30ª having horizontally displaceable intake and exhaust valves 31 and 32, respectively, controlling companion intake and exhaust ports 33 and 34. The intake side of each valve is connected by a common pipe 35 to a high pressure supply line 36, while the exhaust side of each valve is connected to the companion pipe 28 or 29 for admitting the air under pressure to or exhausting it from the cylinders 23. The valve bodies 30, 30ª are preferably so disposed that the intake and exhaust valves of one body are in opposing alining relation with the exhaust and intake valves, respectively, of the companion valve body, and interposed between these valve bodies is a pneumatically-actuated valve-controlling device which functions to govern the simultaneous opening or closing of the opposing valves. This controlling device consists of a cylinder 37 disposed at right angles to the plane of movement of the valves and having a double-headed valve-actuator or piston 38 operable therein including a reduced medial shank 39. Guided in the diametrically opposite side walls of this cylinder are two sets of plungers 40, 41 which are disposed in alining, abutting engagement at their outer ends with the stems of the companion pairs of intake and exhaust valves 31 and 32, respectively, while their inner ends are disposed for abutting engagement with the heads and reduced shank of the piston 38 to govern the opening and closing movements of said valves. At its opposite ends, this cylinder has air inlet ports 42, 43 through which air under pressure is adapted to be admitted at predetermined times in the cycle of operations of the apparatus to force the piston 38 in one direction or the other to thereby effect the movement of one set of alined opposing valves 31, 32, from a closed to an open position and permit the movement of the companion set of valves from an open to a closed position, as when governing the movement of the platform 14 to a lowered operative position or to an elevated inoperative position, the air pressure in the system functioning at such times to close and maintain such companion set of valves closed until such piston or valve-actuator is shifted in its cylinder to again open those valves. The cylinder-port 42, which might be termed the starting port for initiating the lowering of the platform 14 to its welding position, is connected by a branch pipe 44 to the pipe 35 at a point between its connections to the intake sides of the valve-bodies 30, 30ª, and interposed in such branch pipe is a normally-closed valve 45 adapted to be opened manually through the medium of a depressible knob 46. When thus opened, air under pressure is admitted to the cylinder 37 to force its piston 38 to a position to open that set of valves 31, 32 governing the lowering of the platform 14 and simultaneously closing the companion set of valves, whereby air under pressure is delivered from the supply line 36 to the valve body 30 through that branch of the pipe 35 connected thereto, and thence through the pipe 28 to the pipe 26 connected to the upper ends of the cylinders 23 to lower their pistons 24. At this time, the intake and exhaust valves of the valve body 30 are opened and closed, respectively, while the companion valves of the valve body 30ª are closed and opened, respectively, whereby the air in the cylinders below the pistons is expelled through the pipes 27 and 29 into said valve body 30ª and thence exhausted through its port 34 into the atmosphere. It will be understood that, when the valve-shifting plungers 40, 41 abut the reduced shank 39 of the valve-actuating piston 38, the companion set of valves 31, 32 is urged to a closed position by the air pressure admitted to the valve bodies through one or the other branches of the pipe 35 and by the air expelled from the cylinders 23 through one or the other of the pipes 28, 29. The elevation of the platform 14 is effected in the same manner but by a reversal of the air-governed valve system and the setting of the valve-actuator 38 for this purpose is automatically effected at the termination of the welding operation by the admission of air under pressure through the other port 43 of the cylinder 37 in a manner which will hereinafter appear.

Applied to and depending from the elevating platform 14 is an electrode holder or frame 47 from which a plurality of electrodes 48 are suspended in like position or relation to the conductor points 18 rising from the fixed platform 13 for cooperative welding relation therewith. Connected at one end to these electrodes are conductor bars 49 which are adapted at predetermined times in the welding cycle to automatically make contact at their opposite or free ends with a common contact strip 50 included in the secondary circuit of the spot welder unit. Coil springs 51 interposed between these electrode-bars and their holder frame tend constantly to displace the bars downward or to a circuit-opening position and at the same time serve as cushioning elements for the electrodes when the platform 14 is lowered to bring such electrodes into contact with the work and in opposed operative alinement with the companion fixed conductor points 18. Operatively disposed beneath the free end of each electrode-bar 49 is a pneumatically-actuated piston 52 operating in a cylinder 53 supported on the holder frame 47 and having an air intake pipe 54 connected thereto, so that when air is admitted to such pipe the piston is elevated to displace the companion electrode bar into contact with the strip 50 to thereby close the spot welding circuit across the companion welding elements 18, 48.

The means for automatically governing the actuation of the multiple electrodes 48 in predetermined sequence or progression to perform the spot welds on the work consists of a mechanically-operated valve mounted on the movable platform 14 and including a casing 55 and a cover 56 which jointly form an air chamber 57. Connected to the casing of this valve chamber for delivering air under pressure thereto is an air inlet pipe 58 and formed in the cover thereof are a plurality of outlet ports 59 arranged in an annular row and respectively connected by the corresponding pipes 54 with the contact controlling cylinders 53, one of such ports being connected by a pipe 54ª to the inlet 43 of the cylinder 37. An exhaust port 60 is also provided in the cover which is common to the respective pipe lines 54, 54ª and which is adapted at predetermined times to exhaust the cylinder 53 after an operative stroke has been imparted to the companion pistons 52, as well as the cylinder 37 when the piston 38 is moved to a position for governing the lowering of the platform 14. A rotary disk valve 61 is arranged in the casing 55 for controlling the supply of air to and its exhaust from the respective cylinders 53, and for this purpose is disposed in facial contact with the ported cover 56 and mounted on a horizontal shaft 62 journaled in the casing. This disk-valve has an annular groove-like exhaust port 63 in its inner or contacting face in the circumferential plane of the annular row of outlet ports 59 and one or more air outlet ports 64 common to and adapted to progressively register during rotation of the valve with one or another of the casing outlet ports 59 to supply air to the respective cylinders 53 and the cylinder 37. For the purpose of balancing the pressure on the contacting face of the valve 61, the cover has a recess 65 therein and the valve has a registering port 66 for establishing communication between such recess and the air chamber 57.

The disk-valve 61 is adapted to be intermittently turned to progressively govern the actuation of the electrode circuit closing pistons 52 by a ratchet and pawl feed mechanism consisting of a gear 67 fixed on the valve-shaft 62 and feed pawls 68 and 69 disposed in operative engagement therewith. The pawl 68 serves to impart an initial or presetting movement to this valve during the descent of the platform 14 to its welding position, while the companion pawl 69 is automatically actuated to intermittently advance the valve to govern the progressive operative strokes of the pistons 52 and in turn the operation of the multiple welding elements 18, 48 in proper sequence. For this purpose, the pawl 68 is mounted on a vertically-swinging lever 70 applied freely to the front end of the valve-shaft 62 and having an upright tie rod 71 connected at its lower end thereto while its upper end is suitably guided and provided with an adjustable collar or shouldered member 72 adapted to bear at its lower end against a fixed abutment 73 disposed at the upper end of the machine frame. Thus, at a predetermined time in the lowering of the platform 14, the collar 72 will encounter the abutment 73 to arrest its downward movement and compel a relative upward swinging of the lever 70 to cause the pawl 68 to advance the gear 67 and the disk-valve to a given starting position or in readiness for the valve to be automatically actuated by the companion pawl 69.

The intermittently-driven pawl 69 is applied to the outer end of a lever 74 pivoted at its inner end to a crank arm 75 applied to a driven horizontal shaft 76 journaled in a suitable bearing-lug 77 formed on the valve-casing 55. This shaft may be driven from an electric motor 78 mounted on the platform 14 at one side of the valve-casing through the medium of a belt drive 79 and reduction gearing 80, 81. A spring 82 connected to the pawl-carrying lever 74 serves constantly to urge it toward the periphery of the gear 67. For each revolution of the crank shaft 76, the valve 61 is turned a fraction of a revolution, that is, a distance equal to the space between the casing outlet ports 59. During the idling or reverse stroke of the ratchet feed, air is admitted to the respective electrode-governing cylinders 53, while during the advancing stroke of the ratchet feed the air is exhausted from such cylinder through the ports 60, 63 to cause the return of the governed electrode conductor bar 49 to its initial circuit-opening position.

At the termination of the welding operation, air under pressure is admitted to the cylinder 37 through its port 43 from the air chamber 57, valve-port 64, and the alining cover-port 59 to which the pipe 54ᵃ leading to such cylinder-port is connected, thereby causing the valve-actuator 38 of the air-governed valve system to effect a reverse setting of the valves 31, 32 and to distribute the air through the pipes 29 and 27 into the bottom of the cylinders 23 to elevate the platform 14 to its initial position preparatory to the next welding stroke. It will be noted that there are no packings provided between the plungers 40, 41 and the cylinder 37 and the air is free to leak or exhaust therethrough, so that when pressure is admitted to the cylinder any entrapped air is free to escape between the cylinder and piston and the plungers.

At one or more points along its periphery, depending upon the number of multiple electrodes employed in a given welding operation, the pawl-engaging gear 67 is devoid of a tooth or teeth to provide a gap or space 83 to permit an idling action of the constantly moving intermittent feed pawl 69 in such space during such time as may elapse between the completion of a given welding operation and before the start of another welding operation. At the start of a given welding operation and during the lowering of the platform 14 to its weld-operating position, the companion or initiating pawl 68 is actuated in the manner heretofore described to advance the gear a fraction of a revolution to move its gap 83 out of the operating range of the pawl 69 and present the latter between the next adjoining pair of teeth, whereby such pawl is set to intermittently advance the gear and the disk-valve 61 for automatically controlling the multiple spot welding operations, and at the completion thereof, the raising of the platform 14 to its elevated position.

Rising from the lower platform 13 in the lowering path of movement of the movable platform 14 are stop members 84 which serve to limit the downward movement of such platform to its welding position.

In Figures 10 and 11, I have shown a modified arrangement of the electrode-mountings, 85 indicating one of the fixed electrodes of a multiple unit assembly and 86 the companion displaceable electrode terminating at its upper end in a contact bar or head 87 for movement to and from circuit-closing engagement with the common contact strip 88. This displaceable electrode is suspended for a more or less full floating position and connected thereto adjacent its lower end is an arm or bracket 89 guided for universal movement on a post 90 depending from the electrode-holder 47 of the platform 14, the bracket having an opening 91 therein provided with convexly-curved walls whereby the electrode is free for both vertical and limited tilting displacement to bring its contact bar 87 to and from a circuit-closing position. A spring 92 interposed between the bracket and a shoulder 93 formed on the post serves to not only cushion the movement of the displaceable electrode in its welding-position and compensate for any variance in its welding stroke, but also to normally urge such electrode to a position wherein its contact bar is released from contact with the strip 88.

In its upper portion the post 90 is shaped to provided a plurality of superposed, adjoining horizontal cylinders 94 containing fluid-actuated pistons 95 engageable with the opposing side of the electrode-bar 87 for urging it into circuit-closing contact with the strip 88. These cylinders open at their front side into a common chamber 96 which is connected by a pipe 97 with the electrode-governing valve 55 in the same manner as the electrode-controlling cylinders of the previously described construction. When fluid under pressure is admitted to the chamber 96, the series of pistons 95 are simultaneously advanced in their cylinders to effectually force the companion electrode-head 86 into firm contact with the strip 88 to close the circuit across the electrodes 85. When the fluid is automatically exhausted from each chamber 96, as governed by the valve 55 when a given multiple weld is completed, the pistons are retracted and the electrode 86 is automatically restored to its substantially tilted inoperative position with its head 87 out of contact with the strip 88.

Each of these electrode assemblies is a complete unit in itself, making it easy to apply and remove from the holder 47 when necessary, and for this purpose the upper end of the post 90, on which its various parts are mounted is provided with a threaded stud 98 by which the assembly is detachably secured to the holder.

The welding transformer circuit of this apparatus is adapted to be automatically closed when the same is started up and for this purpose a pneumatically-actuated switch 99 is provided which is normally held open by springs 100. This switch includes a plunger 101 operating in a cylinder 102 connected by a pipe 103 with the upper end of one of the platform-actuating cylinders 23. By this construction, when air is admitted to these cylinders to bring the parts into operative welding position, some of the air is admitted to the switch-actuating cylinder 102 to close the switch. The latter is then maintained closed until the pressure is exhausted from the line.

I claim as my invention:

1. In a welding apparatus, a frame having relatively-movable, electrode-supporting members thereon between which the work to be welded is adapted to be placed, a plurality of electrodes applied to one of said members, companion, individually displaceable electrodes applied to the other member, each of said displaceable electrodes having a circuit-closing contact element connected thereto, a contact strip common to said electrode contact elements and relative to which the latter are movable to and from a circuit-closing position, and pneumatically-operated mechanism associated with each of said electrode contact elements for actuating them to circuit-closing position for completing the welding circuit.

2. In a welding apparatus, a frame having relatively-movable, electrode-supporting members thereon between which the work to be welded is adapted to be placed, a plurality of electrodes applied to one of said members, companion, individually displaceable electrodes applied to the other member, each of said displaceable electrodes having a circuit-closing contact element connected at one end thereto, a contact strip common to and disposed in bridging relation to the opposite free ends of said electrode contact elements and relative to which the latter are movable to and from a circuit-closing position, and pneumatically-operated mechanism associated with said displaceable electrodes and including means disposed in operative relation to the free ends of their contact elements for shifting the latter to circuit-closing position.

3. In a welding apparatus, a frame having relatively movable electrode-supporting members mounted thereon between which the work to be welded is adapted to be placed, fluid-pressure means operatively connected to one of said members for governing its movement toward and from the companion member, a system of valves including a common reciprocable actuator therefor movable to one or the other of two positions for controlling the operation of said fluid-pressure means, operator-governed means for initiating the setting of said actuator to one of its positions for establishing said valve system in a position for causing the movement of one of the electrode-supporting members toward the other, a plurality of sets of electrodes applied to said supporting members, each set including normally-open, circuit-closing contacts associated therewith, an electric circuit including said electrodes, an electric switch included in said circuit and having a fluid pressure actuated means associated therewith and in operative communication with the fluid-pressure means of the movable electrode supporting member for closing and maintaining such switch closed during the operation of the apparatus, means operatively connected to said electrode-contacts for bringing them into circuit-closing relation for completing the welding circuit at predetermined times to successively render the companion sets of electrodes operative, and means correlated with said electrode-contact operating means and said valve-actuator and rendered operative subsequent to the operative closing of said electrode-contacts for initiating the setting of the valve-actuator to its other position for establishing said valve system in a position for causing the movement of the movable electrode-supporting member to its initial inoperative position.

4. In a welding apparatus, fixed and movable platforms having companion sets of electrodes thereon and between which the work to be welded is adapted to be placed, pneumatically-actuated means for shifting the movable platform to and from the companion fixed platform, normally-open, circuit-closing contacts for each set of companion electrodes, pneumatically-actuated means associated with said electrode-contacts for operating them individually to circuit-closing positions at predetermined times to complete the welding circuit, mechanically-actuated valve means operatively connected to said electrode-contact actuating means for governing the actuation of such contacts in sequence to circuit-closing positions, a system of duplicate valves disposed in operative governing relation to said pneumatically-actuated, platform-shifting means for controlling the movements of the movable platform toward and from the fixed platform, and means disposed in operative relation to said duplicate valves for setting them in position for controlling the shifting of the movable platform in one direction or the other, said means including a pneumatically-operated, reciprocating actuator engageable with said valves for alternately establishing them in their respective operative positions when the same is moved to one or the other of its reciprocated positions.

5. In a welding apparatus, fixed and movable platforms having companion sets of electrodes thereon and between which the work to be welded is adapted to be placed, pneumatically-actuated means for shifting the movable platform to and from the companion fixed platform, normally-open, circuit-closing contacts for each set of companion electrodes, pneumatically-actuated means associated with said electrode-contacts for operating them individually to circuit-closing positions at predetermined times to complete the welding circuit, mechanically-actuated valve means operatively connected to said electrode-contact actuating means for governing the actuation of such contacts in sequence to circuit-closing positions, a system of duplicate valves disposed in operative governing relation to said pneumatically-actuated, platform-shifting means for controlling the movements of the movable platform toward and from the fixed platform, and a pneumatically-operated reciprocable actuator disposed in governing relation to said duplicate valves for alternately setting one set and then the other in position for controlling the shifting of the movable platform in one direction or the other, said actuator being adapted to be set in one position by a manually-initiated control and having a connection with said contact-operating valve means for automatically effecting the setting of said actuator in its other position subsequent to the sequence circuit-closing operation of the electrode-contacts.

6. In a welding apparatus, fixed and movable platforms having companion sets of electrodes thereon and between which the work to be welded is adapted to be placed, pneumatically-actuated means for shifting the movable platform to and from the companion fixed platform, normally-open, circuit-closing contacts for each set of companion electrodes, pneumatically-actuated means associated with said electrode-contacts for operating them individually to circuit-closing positions at predetermined times to complete the welding circuit, means operatively connected to said electrode-contact actuating means for governing the actuation of such contacts in sequence into circuit-closing position to successively render the companion sets of electrodes operative, a system of duplicate valves disposed in operative governing relation to said pneumatically-actuated, platform-shifting means for controlling the movements of the movable platform toward and from the fixed platform, said electrode-contact governing means including an air supply chamber and a valve operable therein for movement in predetermined timed fashion to one or another of a plurality of positions for initiating the successive actuation of the electrode-contact actuating means, means for actuating said valve to said positions and to a third position, and a pneumatically-operated reciprocable actuator disposed in governing relation to said duplicate valves for alternately setting one set and then the other in position for controlling the shifting of the movable platform in one direction or the other, said actuator being adapted to be set in one position by a manually-initiated control and having an operative connection with said air supply chamber and valve for automatically effecting the setting of said actuator in its other position upon the movement of said valve to such third position subsequent to the completion of the successive closing of said electrode-contacts.

7. In an apparatus of the character described fixed and movable platforms, and pneumatically-actuated means for shifting the movable platform to and from operative relation with the fixed platform including a cylinder having a piston operable therein and connected to said movable platform, a fluid pressure line adapted for communication with opposite ends of said cylinder, a system of duplicate valves interposed in said pressure line for governing the admission of fluid pressure to and its exhaust from said cylinder each valve including a valve body having connections, respectively, to the pressure line and to one or the other end of said cylinder and intake and exhaust ports, horizontally-displaceable intake and exhaust valves controlling said companion ports, means operatively connected to said valves for setting them at predetermined times to positions for controlling the shifting of the movable platform in one direction or the other, said valve-setting means including a reciprocable, double-headed actuator disposed between said duplicate valve-bodies and operatively engageable in one position thereof and in opposing fashion with the intake valve of one body and the exhaust valve of the other body to open the same and to release the companion valves of the duplicate valve system for movement by fluid pressure to a closed position, said actuator operating vice versa in its other position, and means for governing the movement of the actuator in opposite directions to control the shifting of the movable platform relative to the fixed platform.

8. In an apparatus of the character described, fixed and movable platforms, and pneumatically-actuated means for shifting the movable platform to and from operative relation with the fixed platform including a cylinder having a piston operable therein and connected to said movable platform, a fluid pressure line adapted for communication with opposite ends of said cylinder, a system of duplicate valves interposed in said pressure line for governing the admission of fluid pressure to and its exhaust from said cylinder, each valve including a valve body having connections, respectively, to the pressure line and to one or the other end of said cylinders and intake and exhaust ports, horizontally-displaceable intake and exhaust valves controlling said companion valve-ports and including opposing pairs of actuating stems therefor, a cylinder disposed substantially centrally between said duplicate valve bodies with its axis at right angles to the actuating valve stems and adapted for communication at its opposite ends with said fluid pressure line, plungers guided in the diametrically opposite side walls of said cylinder in alining abutting engagement at their outer ends with the companion pairs of intake and exhaust valve-stems, a double-headed, valve-actuating piston operable in said cylinder for abutting engagement with the inner ends of said plungers for governing the opening and closing movements of said valves to control the shifting of the movable platform toward and from the fixed platform, and means for initiating the movement of said valve-actuating piston to its respective controlling positions, said means including a manually-controlled valve interposed in said pressure line for initiating the movement of the valve-actuating piston in a direction to cause the lowering of the movable platform and other valve means interposed in said pressure line for initiating the movement of the valve-actuating piston in the opposite direction to cause the raising of the movable platform.

9. In an apparatus of the character described, fixed and movable platforms, and pneumatically-actuated means for shifting the movable platform to and from operative relation with the fixed platform including a cylinder having a piston operable therein and connected to said movable platform, a fluid pressure line adapted for communication with opposite ends of said cylinder, duplicate valve chambers interposed in said pressure line and including horizontally-movable intake and exhaust valves for regulating the admission of fluid pressure to and its exhaust from said cylinder to govern the movement of the movable platform toward and from the fixed platform, said valves having valve-stems with the stems of the intake and exhaust valves of one valve chamber disposed in opposing relation, respectively, to the stems of the exhaust and intake valves of the other chamber, a cylinder adapted for communication at its opposite ends with said fluid pressure line and having a reciprocating actuator therein in opposing operative engagement with the stems of said intake and exhaust valves for setting them in their respective positions, and means for controlling the admission of pressure to said last-named cylinder for governing the valve-setting positions of its actuator.

10. In a welding apparatus, fixed and movable platforms having companion sets of electrodes thereon and between which the work to be welded is adapted to be placed, circuit-closing contacts for each set of companion electrodes, mechanism operatively associated with each set of electrode-contacts for actuating them at predetermined times to circuit-closing position for completing the welding circuit, and pneumatically-actuated means for shifting the movable platform to and from welding relation with the fixed platform including a cylinder having a piston operable therein and connected to said movable platform, a fluid pressure line adapted for communication with opposite ends of said cylinder, duplicate valve chambers interposed in said pressure line and including opposing sets of intake and exhaust valves for regulating the admission of fluid pressure to and its exhaust from said cylinder to govern the movement of the movable platform toward and from the fixed platform, a cylinder adapted for communication at its opposite ends with said fluid pressure line and having a double-headed, reciprocating actuator therein, said intake and exhaust valves having portions guided in said actuator-cylinder for abutting engagement with said actuator, manual means for controlling the admission of fluid pressure to one end of the actuator-cylinder to effect the displacement of the actuator in one direction for setting said valves in a position for actuating the movable platform toward the fixed platform, and means governed by said electrode-contact mechanism at a predetermined time in its operation for automatically governing the displacement of such actuator in the opposite direction for setting said valves in a position for actuating the movable platform in the opposite direction.

11. In a welding apparatus, companion fixed and relatively displaceable electrodes, the latter having contact-heads thereon, a contact strip with which the heads of said displaceable electrodes are adapted to engage for closing the welding circuit, and a self-contained means for supporting each of the displaceable electrodes and for actuating them to and from circuit-closing engagement with said contact strip comprising a member disposed alongside and in spaced relation to said contact strip, a universally-movable bracket mounted on said member and to which one end of the companion displaceable electrode is fixed with the head thereof disposed in the space between said member and said contact strip, means acting on said bracket for normally urging it in a direction to bring the electrode-head out of engagement with the contact strip, and pneumatically-actuated means applied to said member and engageable with the electrode-head for shifting the latter into engagement with the contact strip.

12. A mounting for a welding electrode, comprising a support having a contact strip thereon, a member detachably secured to said support in spaced relation to said contact strip and provided at its lower end with a relatively movable bracket, an electrode rising from said bracket in the space between said supporting member and said contact strip, and means applied to the upper portion of said member for displacement relative thereto and engageable with said electrode for governing its movements to and from said contact strip.

13. A holder for a displaceable welding electrode, comprising a member adapted for attachment to a welding apparatus, a bracket applied to the lower end of said member for a limited movement relative thereto, an electrode connected at one end to said bracket to move therewith to and from a contacting position, a spring for normally urging said bracket in a direction to move the electrode from its contacting position, and pneumatically-actuated means disposed in the upper portion of said member for engagement with the upper end of the electrode to initiate the movement of the latter to its contacting position.

JOHN F. GEIBEL.